(12) United States Patent
Teetaert et al.

(10) Patent No.: US 8,220,238 B2
(45) Date of Patent: Jul. 17, 2012

(54) HEADER FOR A FORAGE HARVESTER

(75) Inventors: Pierre E. Teetaert, Aartrijke (BE);
Didier O. M. Verhaeghe, Ieper (BE);
Sandor W. van Vooren, Sijsele-Damme (BE)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 13/200,415

(22) Filed: Sep. 23, 2011

(65) Prior Publication Data

US 2012/0017557 A1 Jan. 26, 2012

Related U.S. Application Data

(62) Division of application No. 12/653,031, filed on Dec. 7, 2009, now Pat. No. 8,091,328.

(30) Foreign Application Priority Data

Dec. 8, 2008 (EP) .................................. 08170940.4

(51) Int. Cl.
*A01D 43/00* (2006.01)
(52) U.S. Cl. .............................. 56/157; 460/70; 56/13.6
(58) Field of Classification Search .................... 460/70, 460/71; 56/157, 13.6, 60, 51, 119, 98, 64
See application file for complete search history.

(56) References Cited

U.S. PATENT DOCUMENTS

| | | | | |
|---|---|---|---|---|
| 2,910,819 A * | 11/1959 | Helliwell | ........................ | 56/220 |
| 2,978,097 A * | 4/1961 | Blanshine | ..................... | 198/608 |
| 4,170,235 A * | 10/1979 | Ashton et al. | ................... | 460/16 |
| 4,338,985 A | 7/1982 | Smith et al. | | |
| 4,550,554 A * | 11/1985 | Lundahl et al. | ................ | 56/294 |
| 4,594,842 A * | 6/1986 | Wolters et al. | .................... | 56/94 |
| 4,597,510 A * | 7/1986 | Durant | ......................... | 222/195 |
| 4,739,609 A * | 4/1988 | Meier et al. | ..................... | 56/192 |
| 5,722,225 A * | 3/1998 | Wuebbels et al. | ................ | 56/60 |
| 5,822,962 A * | 10/1998 | Wagstaff et al. | ........... | 56/16.4 R |
| 6,093,099 A * | 7/2000 | Groff | ............................. | 460/71 |
| 6,718,743 B2 * | 4/2004 | Rosenbalm et al. | ............... | 56/6 |
| 7,028,458 B2 * | 4/2006 | Bruening et al. | ................ | 56/51 |
| 7,454,888 B2 * | 11/2008 | Barnett | ........................ | 56/14.7 |
| 2010/0269475 A1 * | 10/2010 | Barnett et al. | ................. | 56/157 |

FOREIGN PATENT DOCUMENTS

| | | |
|---|---|---|
| DE | 9316683 | 10/1994 |
| DE | 202007007213 | 8/2007 |
| EP | 0562406 | 9/1993 |

\* cited by examiner

*Primary Examiner* — Arpad Fabian-Kovacs
(74) *Attorney, Agent, or Firm* — Michael G. Harms

(57) ABSTRACT

A coppice header for a forage harvester adapted to be mounted on and powered by a forage harvester. The header including at the front side two circular rotatable knives, a feeding drum being mounted above each knife, said drums being rotatable about the same rotation axis as the respective knives. The header may also be provided with a front feed roll placed behind the knives and two additional feed rolls placed behind the front feed roll, wherein the front feed roll is equipped with guiding blades along the length of the feed roll. The blades have a central protrusion, so that the blades are longer in a region around the middle of the blade than at the lateral ends of the blades. The central protrusion is an inclined surface bent rearwardly away from the rotatable knives.

5 Claims, 7 Drawing Sheets

HEADER FOR A FORAGE HARVESTER

CROSS REFERENCE TO RELATED APPLICATIONS

This divisional application claims priority under 35 U.S.C. §120 from U.S. patent application Ser. No. 12/653,031 filed on Dec. 7, 2009, now U.S. Pat. No. 8,091,328 with the same title, and having Pierre E. Teetaert, Didier O. M. Verhaeghe and Sandor W. van Vooren as inventors. The full disclosure of U.S. patent application Ser. No. 12/653,031 is hereby incorporated by reference. This divisional application also claims priority under 35 U.S.C. §119 to EP 08.170.940.4, filed on Dec. 8, 2008 titled, "Header for a Forage Harvester" and having Pierre E. Teetaert, Didier O. M. Verhaeghe and Sandor W. van Vooren as inventors. The full disclosure of EP 08.170.940.4 is hereby fully incorporated herein by reference.

FIELD OF THE INVENTION

The present invention relates to forage harvesters, in particular to a header adapted to be mounted at the front of such a harvester, as a means for cutting and collecting coppice crops, in particular brushwood or young trees such as poplars or willows, which are currently grown for the production of biomass fuel.

STATE OF THE ART

A forage harvester comprises feed rolls at the front of the machine, and behind said feed rolls a cutting drum to comminute crops that are being fed to said cutting drum by the feed rolls. A header is mounted in front of the feed rolls, said header comprising cutting means and possibly additional conveying means, in order to cut the crops from the land and feed them towards the feed rolls of the harvester. Different headers exist for different crop types. Headers for harvesting coppice crops are documented for example in DE-A-9316683U and DE-A-202007007213U. In each case, the header comprises two circular knife blades arranged to cut off the stems as close as possible to ground level. The rotation axes of the blades are positioned upright and usually somewhat inclined forwardly so that the blades are inclined towards the ground level. Arranged to rotate at a slower speed than the blades and about the same rotation axes, are feeding drums extending above the blades and equipped with guiding means. DE-A-9316683 shows such guiding means in the form of straight radial extensions at the bottom of the feeding drums. DE-A-202007007213U shows a series of radial bars extending at approximately mid-height above the knives. The latter document shows the presence of three horizontal feed rolls inside the header itself, arranged behind the feeding drums, in order to grab the crops provided by the feeding drums, and transport these crops to the feeding and cutting drums of the forage harvester.

These existing systems are open for improvement in a number of areas. One of the occurring problems is the 'double-cutting' of stems, which occurs when the cut stems are insufficiently grasped by the vertical feeding drums and their bottom part is cut a second time by the circular knife blades. Also, in areas where a lot of dirt is on the ground, or on a land surface covered in snow, existing systems tend to transport too much of this undesirable material along with the stems, which leads to an increased risk of blocking.

PURPOSE OF THE INVENTION

The present invention aims to provide a header for a forage harvester, for cutting and harvesting stem bearing crops, without suffering from one or more of the problems highlighted above.

SUMMARY OF THE INVENTION

The present invention relates to a header for a forage harvester, as described in the appended claims.

According to a first aspect of the invention, a header is provided for harvesting coppice crops, said header being adapted to be mounted on and powered by a forage harvester, said header comprising at its front two circular rotatable knives, a feeding drum being mounted above each knife, said drums being rotatable about the same rotation axis as the respective knives, characterized in that each feeding drum is equipped with one or more flat hook-shaped extensions adapted to grab the base of the cut stems in the region immediately above the rotatable knives.

The hooks engage the stem immediately after cutting and are able to guide the stem base inwardly from the outer half of the circular knives towards the central area between the feeding drums. The hooks prevent the stems from sliding off the rotating knives and receiving a second cut before being fed eventually to the drums.

The hook-shaped extensions may be arranged on a ring-shaped plate, mounted below the feeding drum and above the circular knife. Alternatively, the extensions may be integral with the feeding drums.

When the drums are provided with radially extending guiding plates, a hook-shaped extension preferably is provided at the bottom of each radial guiding plate. The hook then guides the cut stem base directly to the guiding plate.

According to a second aspect of the invention, a header is provided for harvesting coppice crops, said header being adapted to be mounted on and powered by a forage harvester, said header comprising at the front side two circular rotatable knives, a feeding drum being mounted above each knife, said drums being rotatable about the same rotation axis as the respective knives, the header further comprising a front feed roll placed behind the knives and two additional feed rolls placed behind the front feed roll, characterized in that the front feed roll is equipped with guiding blades along the length of the feed roll, said blades having a central protrusion, so that the lengths of the blades are greater in a region around the middle of the blades than at the lateral ends of the blades.

The central protrusion enhances the transfer of the stems to the feed rolls of the header and the inlet of the forage harvester by reducing the free space between the upright feed rolls and the envelope of the front feed rolls.

The protrusion preferably is bent with respect to the rest of the blade for more aggressive engagement of the base of the cut stems.

The operation of the header may further be enhanced by providing inwardly inclined guiding plates above the circular knives and/or upright blocking plates adjacent the outer surface of the upright drums.

DETAILED DESCRIPTION OF THE INVENTION

A preferred embodiment will now be described in further detail, by way of example only, with reference to the accompanying drawings. The detailed description is not limiting the scope of the invention, which is defined only by the appended claims. In the following description, the terms 'front', 'before', etc. and 'back', 'rear', 'behind', etc. are consistently used to refer respectively to the front of the header, i.e. the part where the knives are present, and the back of the header, i.e. the side that is connected to the harvester. The terms 'horizontal' and 'vertical' indicate a general direction and are not limiting in a strict sense.

Figure 1:
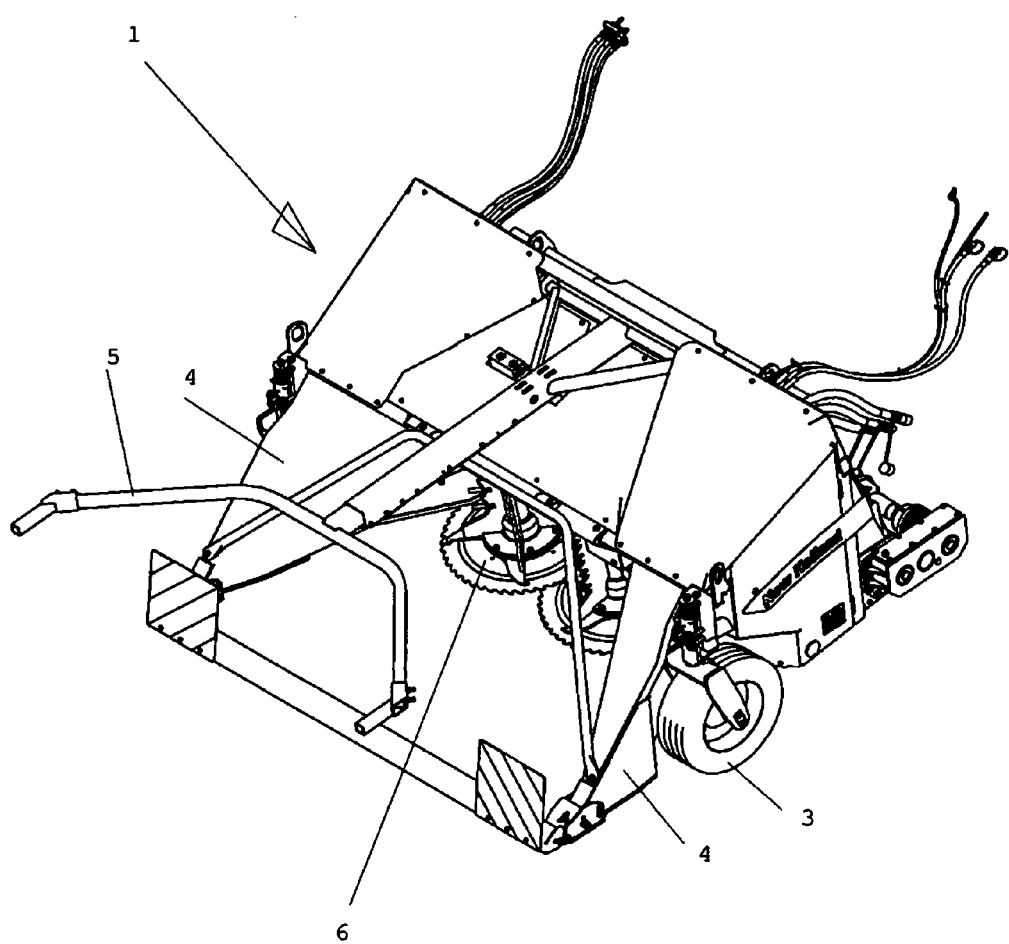
FIG. 1 is a perspective view of a header according to the invention.

FIG. 1 shows a header 1 according to the invention. The header comprises means for attaching the rear section of the header to a feeder unit of a forage harvester of a known type. These attachment means and the means for coupling the header to the power source of the harvester can be manufactured in a suitable way according to known practice. The header is provided with a pair of front swivel wheels 3, front guiding panels 4 arranged in a convergent way with respect to the travelling direction of the harvester, and a push bar 5 for pushing forward the upper part of the stems before cutting. The main working components of the header 1 of the invention and their characteristic elements will be described in more detail with reference to FIG. 2. As shown therein, two rotatable circular knife blades 6 are present, arranged to rotate about substantially parallel rotation axes, and each powered by a hydrostatic motor 8. The direction of rotation is indicated by the two arrows. Two rotatable feeding drums 9 are mounted above the knives 6, and arranged to rotate about the same two rotation axes. The rotation of the feeding drums is powered by a further hydraulic motor 10, through gearbox 7, which is mounted above the feeding drums 9. The motor 10 and the feeding drums are adapted to rotate at an angular speed which is normally much lower than the speed of the knives 6, to thereby gather the cut stems into the header. For this purpose, the feeding drums have radial extension plates 15 extending along the height of the drums, with radial bar-like extensions 16 protruding at mid-height from these plates 15. Three horizontal feed rolls 20, 21 and 22 may be arranged behind the knives, for grabbing and transporting the cut stems towards the inlet of the forage harvester.

Figure 2:
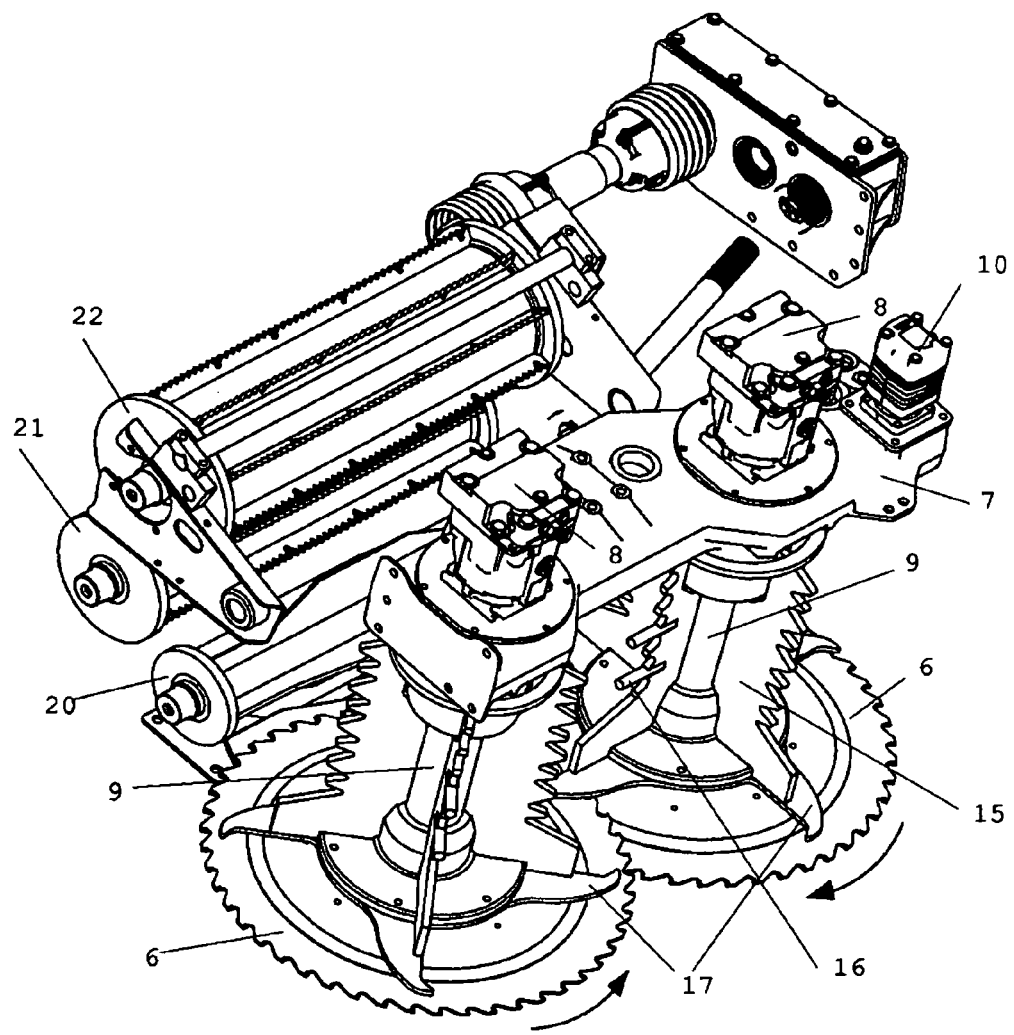
FIG. 2 is a perspective view of the main working components of a header of FIG. 1.
Figure 3:
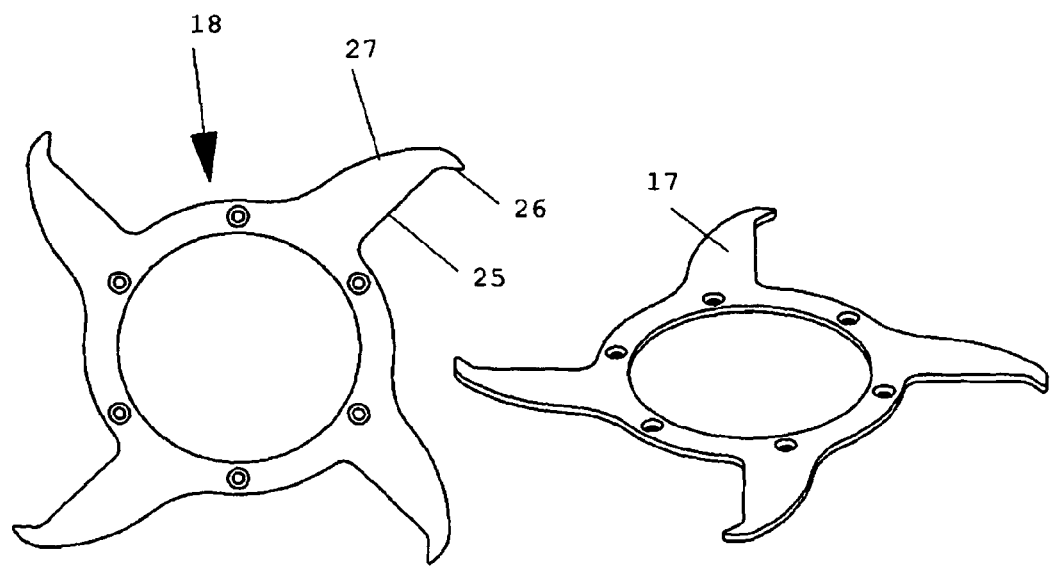
FIG. 3 shows detailed views of a separate plate with hook-like extensions, which may be mounted between the feeding drums and the circular knives shown in FIG. 2.
Figure 4:
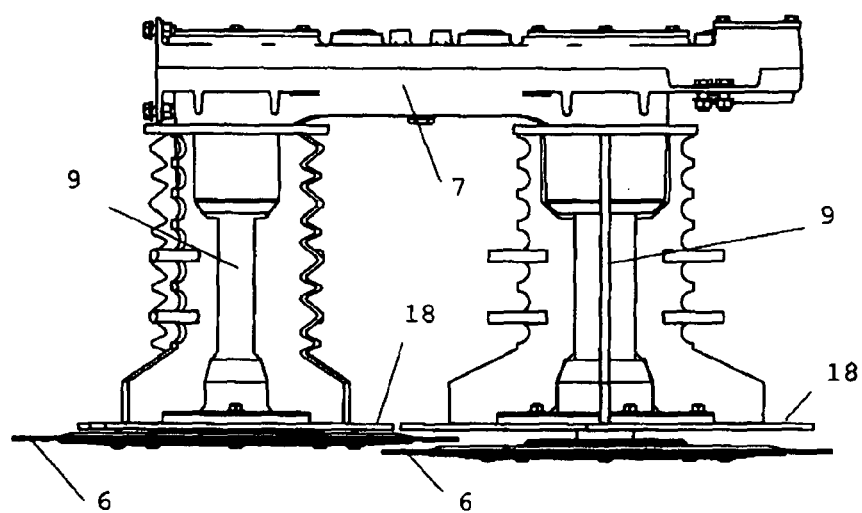
FIG. 4 is a front view of the circular knives, feeding drums and gearbox shown in FIG. 2.

According to a first aspect of the invention, additional radial extensions in the form of flat hook-like extensions 17 are provided at the bottom portion of the feeding drums, i.e. in close proximity to the upper surface of the rotatable knife blades 6 and essentially parallel to said surface, so as to grab the base of the cut stems in the region immediately above the knife blades and guide the stems toward the back of the header 1. In the embodiment of FIG. 1, four hooks are present on each feeding drum. As illustrated in FIG. 2, these hooks may be part of a separate ring-shaped plate 18 which is mounted to the feeding drums so that the hooks are arranged between each feeding drum 9 and the corresponding knife blade 6. A detailed view of such a ring is shown in FIG. 3. Alternatively, the hooks may be integral with the bottom section of the feeding drums. The hooks are preferably arranged so that the hooks of the two feeding drums are rotating in the same plane, as is visible in FIG. 4.

The hook-shape of the extensions 17 ensures that cut stems are gathered very early after cutting, and that the bases of those cut stems are held positively during the transport towards the interior of the header (i.e. the space between the feeding drums 9). This firm hold prevents the stems from sliding off the knife blades 6, hitting the ground and being cut a second time. Furthermore, the height and shape of the hooks is such that the stems are released at the appropriate moment when they are grabbed between the feeding drums. As the stems are being dragged inward, their top portions are pushed forward first by push bar 5 and then by the gearbox 7, until the bases of the stems flip over the height of the hooks and are released from the hooks 17. The length and height of the hooks is selected to make sure that this moment of release takes place when the stems are in an appropriate position for being guided further into the forage harvester. For example, when the header comprises front and rear feed rolls 20 to 22, this position of release is a position which is sufficiently close to the front feed roll 20. In this way, it is ensured that a maximum of stems are effectively grabbed by said feed roll 20, without falling down from the knife blades 6 on the ground, so that the amount of double-cut stems is minimized.

As seen in FIG. 3, the preferred shape of the hooks is such that each hook has a concave side consisting of a straight portion 25, and a short forwardly bent portion 26 at its end, whereas the convex side consists of a curved portion 27. The short bent portion is bent forwardly with respect to the sense of rotation of the hook extension 17 at a sufficient angle in order to aggressively grab the cut stems, after which the stems are supported by the whole of the hook's concave side 25, 26 until the moment of release. It is clear that other hook-shapes can be used within the scope of the invention.

According to the preferred embodiment, the number of hook extensions 17 corresponds to the number of radial plates 15, and each hook is provided at the bottom of one of the radial plates, the concave side of the hook extending from the bottom of the plate 15, so that optimal cooperation takes place between the plate 15 and the hook 17. Other configurations are however possible within the scope of the invention, e.g. non-equal number of radial plates and hooks, hooks but no radial plates, hooks in combination with radial guiding stems.

Figure 5:
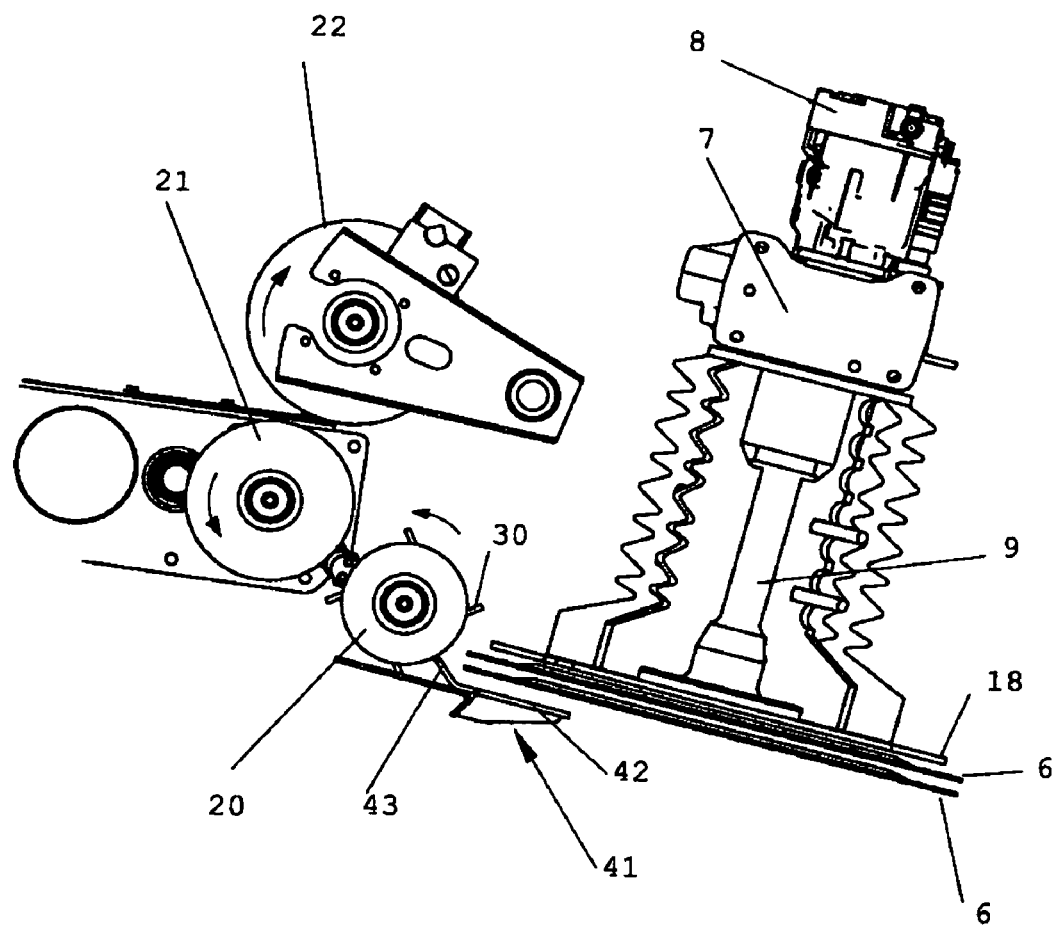
FIG. 5 is a side view of the components of FIG. 2.
Figure 6B:
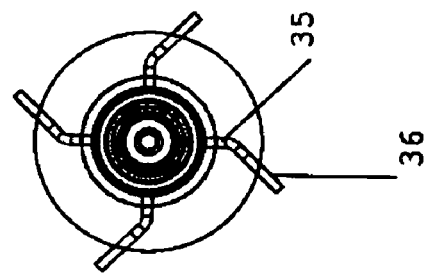
FIG. 6 is a perspective view of a front feed roll in a preferred embodiment of the header of the invention.
Figure 6A:
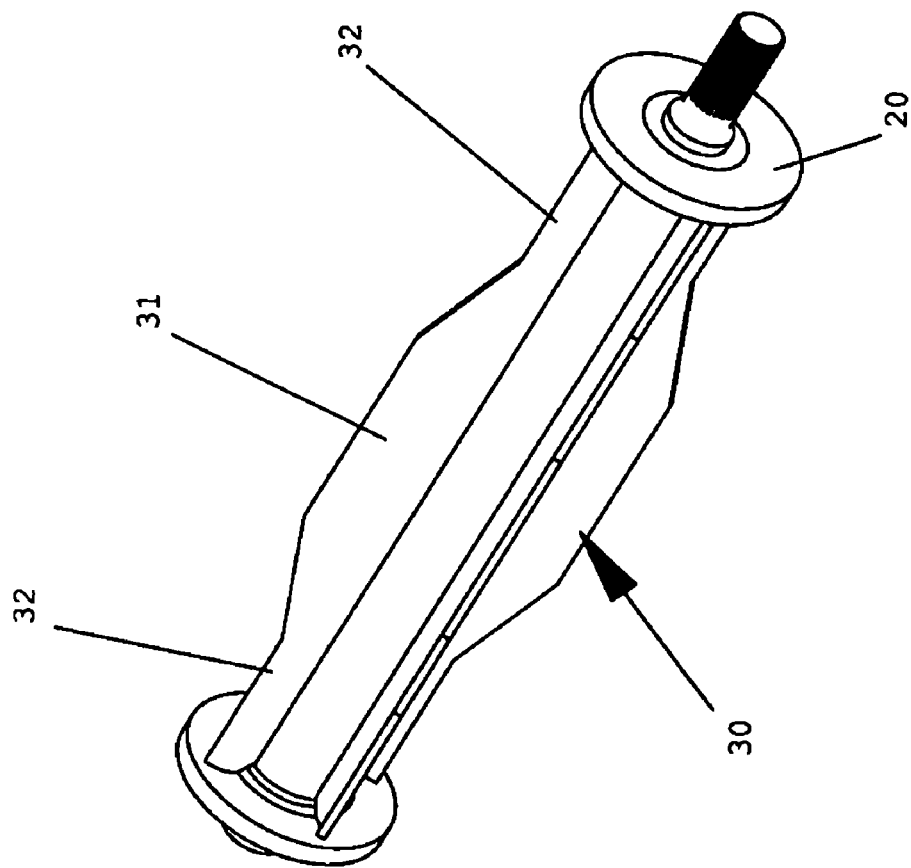

According to a second aspect, the invention relates to a header 1 comprising a front feed roll 20, which is positioned immediately behind the rotating knives, as is visible in FIG. 2 and more clearly in the side view of FIG. 5, and two further feed rolls 21 and 22, located behind the front feed roll 20. The second and third feed rolls 21 and 22 are arranged to cooperatively transport cut stems through the space between these rolls. When the header 1 is mounted to the forage harvester, the level of this space is corresponding substantially to the level of the front feed rolls of the cutting system of the harvester. The front feed roll 20 of the header is arranged to grab the stems that are being fed into the header by the vertical feedings drums 9. The powering of the three feed rolls 20, 21, 22 can be performed in a manner known in the art. They may be driven from the drive system of the infeed section of the forage harvester so as to maintain speed synchronisation between all feed rolls and ensure an even feeding of the crop to the rotating cutterhead of the harvester. In FIG. 5, it can be seen that the knives 6 are tilted slightly forward, and that the rotation axis of the front feed roll 20 is positioned slightly above the plane of the rotating knives. The presently described aspect of the invention centres on certain characteristics of the front feed roll 20. According to this embodiment, as seen in FIG. 6, the front feed roll 20 is equipped with transverse guide blades 30 extending along the length of the roll and pointing outwards from the circumference of the roll in a generally radial direction (not necessarily along a radius, but pointing away from the roll). According to the invention, these blades are provided with a central protrusion 31 so that the length of the blade is greater in a region around the centre of the blade compared to the sides of the blade. Preferably, the protrusion 31 has a trapezium-shape, as shown in FIG. 6a. The protrusion 31 is preferably centred on the middle of the width of the blade such that equal regions 32 of shorter blade-length remain on either side of the protrusion 31. The blades 30 can be straight and oriented in radial direction, or according to a more preferred embodiment shown in FIG. 6b, the blades have base portions 35 oriented radially and top portions 36 bent forwardly with respect to the normal rotation of the feed roll 20. Preferably, this bent portion 36 corresponds to the protrusion 31 of the blade. Hence, when a blade 30 is present at the top of the feed roll, the top portion 36 is bent away from the feeding drums 9 and knives 6, i.e. toward the back of the header. This ensures optimal grabbing of the stems by the front feed roll 20, as it rotates counter-clockwise in the view of FIG. 5. The trapezium-shape leads to lateral open spaces between the front feed roll 20 and the two back rolls 21 and 22. These open spaces allow for the easy evacuation of excessive amounts of dirt, snow or other undesirable materials, during operation of the header. Furthermore, the inclined portions of the central protrusion 31 provides an improved and more equal distribution of cut stems over the width of the feed rolls.

Figure 7:
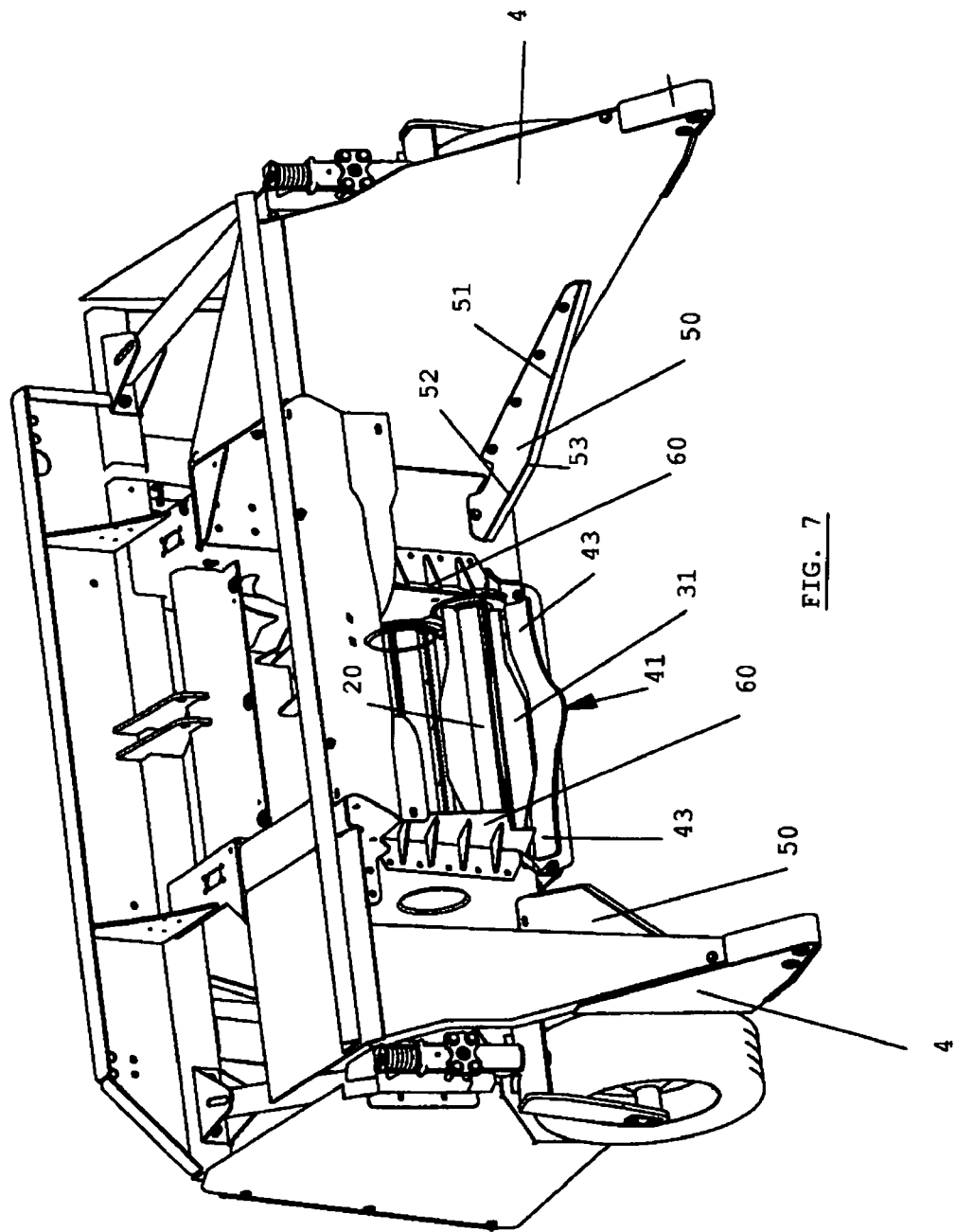
FIG. 7 is a perspective view of the header of FIG. 1 with the feeding drums and knives removed, in order to show a number of additional components.

In order to ensure optimal guidance of the cut stems towards the trapezium-type front feed roll 20, a horizontal transition plate 41 is preferably mounted between the knives 6 and the front feed roll 20, as shown in FIGS. 5 and 7. FIG. 7 is a view of the header with the knives, feeding drums and gearbox taken out, in order to visualize a number of specific components, such as the horizontal plate 41. The front feed roll 20 is visible on this figure, with the trapezium-shaped protrusions 31. According to the preferred embodiment, the transition plate 41 has a first portion 42 which is essentially parallel to the plane of the circular knives 6 and is located underneath said knives. The front edge (i.e. pointing towards the front of the header) of portion 42 may have a curved middle portion, as shown in FIG. 7, so as to correspond to the shape of the overlapping knives. On the back edge of the plate 41, two lateral protrusions 43 are present, which are preferably bent upwards to point towards the rotation axis of the front feed roll 20. Said lateral protrusions 43 are arranged in such a manner that the trapezium-shaped portion 31 of the front feed roll 20 may pass between said lateral protrusions, with a limited spacing being left between the protrusions 43 and the trapezium-shaped portion 31. In this way, an optimal guiding of the stems towards the front feed roll is achieved.

Figure 8:
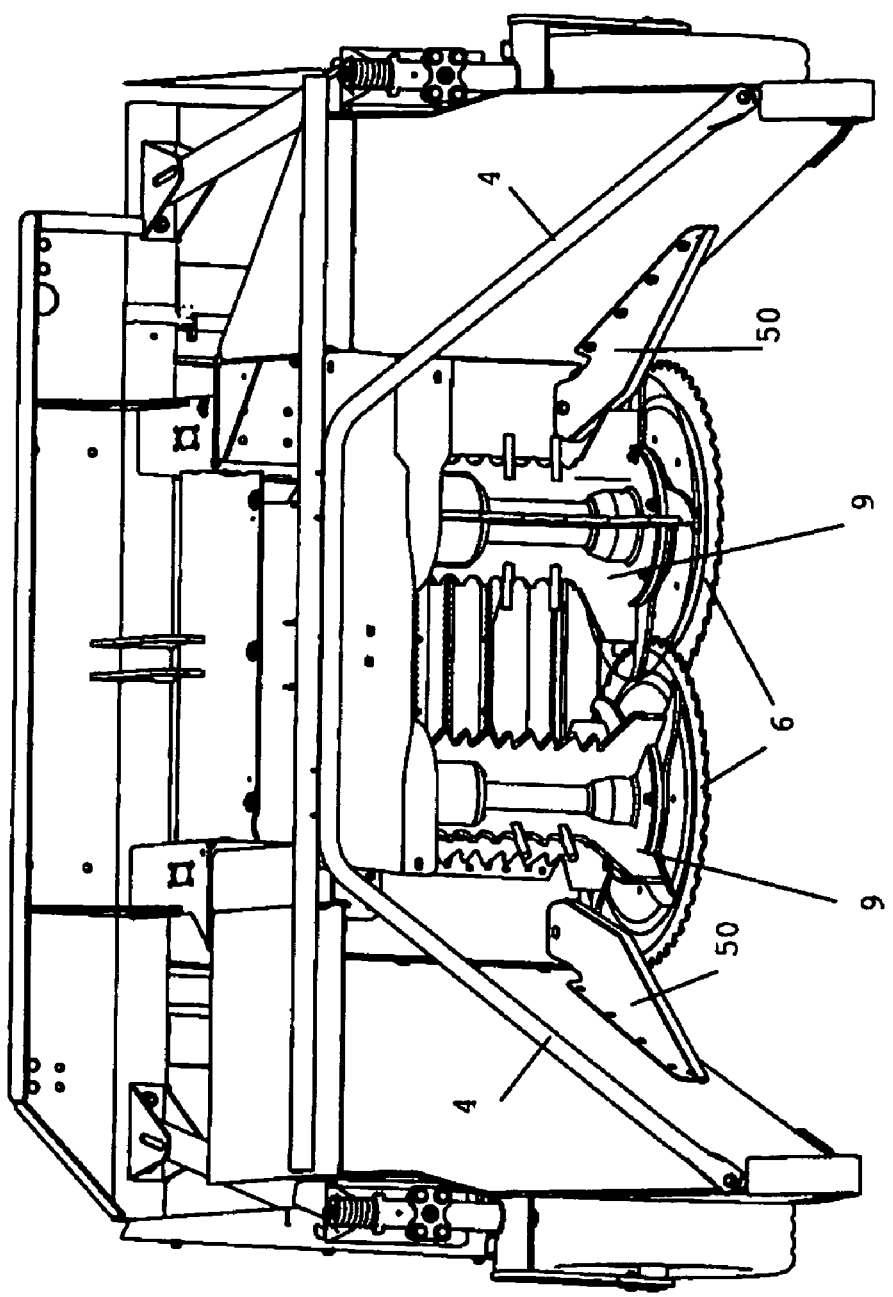
FIG. 8 is a front view of a header according to the invention, in order to illustrate the position of two lateral guiding plates, in relation to the circular knives.

According to another aspect, equally illustrated by FIG. 7 and more clearly visible in FIG. 8, the header comprises two lateral guiding plates 50 placed one on each side of the assembled circular knife blades 6, and located in a plane essentially parallel to said knives. These plates overlap with the rotatable knives, whilst being present above the knives and in close proximity to the top surface of the knife blades. These guiding plates 70 are instrumental in guiding stems that have grown in a horizontal direction. This happens typically when younger stems grow from the stump of a previously cut stem. The plates 70 are mounted against the converging guiding panels 4 of the header and have a long edge 51 at the front of the plate and a short edge 52 at the back, which edges are intersecting in intersection point 53. Said point and a part of the guiding plate in the vicinity of said point overlap with the corresponding knife.

According to another aspect, also illustrated by FIG. 7, two lateral vertical blocking plates 60 are present behind the feeding drums 9, preferably oriented at an angle towards the vertical centre plane of the harvester. The vertical blocking plates have vertically oriented edges, which are located adjacent to the feeding drums with a limited space in between the plates and the feeding drums. In this way, the vertical plates 60 are adapted to prevent cut stems from being rotated back towards the front of the knives, by the rotating feeding drums.

Even though the above characteristics are shown in combination in the drawings, the present invention is not limited to a header wherein all these features are present simultaneously. The invention is related to:
- a header known in the art, and further provided with the hook-shaped extensions 17;
- a header known in the art, and further provided with the trapezium-type feed roll 20, preferably with the horizontal guide plate 41;
- a header known in the art, and further provided with the horizontal lateral guide plates 50;
- a header known in the art, and further provided with the vertical blocking plates 60;
- a header known in the art and further provided with two or more of the above features in combination.

The invention claimed is:

1. A header for harvesting coppice crops, said header being adapted to be mounted on and powered by a forage harvester moving in a first direction, said header comprising at the front side two circular rotatable knives, a feeding drum being mounted above each knife, said drums being rotatable about the same rotation axis as the respective knives, the header further comprising a front feed roll rotating in a second direction, wherein the second direction is opposite to the first direction, the front feed roll is placed behind the knives and two additional feed rolls placed behind the front feed roll, wherein the front feed roll is equipped with guiding blades along the length of the feed roll, said blades having a central protrusion, so that the lengths of the blades are greater in a region around the middle of the blades than at the lateral ends of the blades, wherein the lateral ends of the blades are orientated radially with respect to the rotation of the front feed roll, further wherein the central protrusion is an inclined surface bent forwardly with respect to the rotation of the front feed roll, such that when a blade has rotated to the to of the first feed roll, the blade is bent rearwardly away from the feeding drum and knives.

2. A header according to claim 1, wherein said protrusion is trapezium-shaped.

3. A header according to claim 1, wherein a guide plate is present between the circular knives and the front feed roll, said guide plate having a first portion at the front of the plate which is located underneath said knives and lateral protrusions at the back of the plate, said lateral protrusions being arranged so that the central protrusions of the blades of the front feed roll may pass in between said lateral portions when the front feed roll rotates.

4. A header according to claim 1, further comprising two guiding plates, oriented essentially parallel to the plane of the circular knives, and located above said knives, one plate overlapping with one knife and the other overlapping with the other knife.

5. A header according to claim 1, further comprising two blocking plates, oriented essentially vertically, and having vertical edges which are adjacent to the outer surface of the rotatable feeding drums, so as to prevent cut stems from being rotated back towards the front of the header, by said feeding drums.

* * * * *